(12) United States Patent
Edens

(10) Patent No.: US 6,268,574 B1
(45) Date of Patent: Jul. 31, 2001

(54) ELECTRICAL AND PNEUMATIC LOCK-OUT DEVICE

(76) Inventor: Rudolph R. Edens, 37075 31 Mile Rd., Richmond, MI (US) 48062

( * ) Notice: Subject to any disclaimer, the term of this patent is extended or adjusted under 35 U.S.C. 154(b) by 0 days.

(21) Appl. No.: 09/561,793

(22) Filed: May 1, 2000

Related U.S. Application Data

(60) Provisional application No. 60/131,480, filed on Apr. 29, 1999.

(51) Int. Cl.$^7$ .................................................. H01H 27/00
(52) U.S. Cl. ................... 200/43.04; 200/43.05; 200/61.66; 200/334
(58) Field of Search ................. 200/17 R, 43.01–43.07, 200/43.09–43.13, 52 R, 50.01, 50.02, 50.09, 61.62–61.68, 330, 331, 334

(56) References Cited

U.S. PATENT DOCUMENTS

| | | | | |
|---|---|---|---|---|
| 4,189,692 | * | 2/1980 | Bonnar ................................. | 335/205 |
| 4,262,180 | * | 4/1981 | Walter ............................ | 200/153 LA |
| 4,359,615 | * | 11/1982 | Meyerhoefer et al. ............ | 200/42 R |
| 4,511,771 | * | 4/1985 | Rossell ............................... | 200/61.73 |
| 5,432,309 | * | 7/1995 | Takeuchi et al. .................. | 200/61.62 |
| 6,049,276 | * | 4/2000 | Agozzino .......................... | 340/545.1 |

* cited by examiner

Primary Examiner—Michael Friedhofer
(74) Attorney, Agent, or Firm—Lynn E. Cargill

(57) ABSTRACT

An electrical and/or an electrical and pneumatic lock-out device is disclosed for maintenance work crews to render their maintenance worksites more tamperproof and electrical "jumper"-proof, which provides more safety for their operations. The present lock-out device works with a safety interlock switch which either shuts off the electricity, or, if necessary, simultaneously shuts off the electricity and the pneumatic power system to work cell safety gate electrical systems, as well as electrical and pneumatic machinery and assembly line equipment. The present lock-out device acts to more reliably render work cells and manufacturing equipment inoperable for maintenance operations by maintenance crews as the key to the safety interlock switch is permanently attached to a safety pin to be used for closing a gate or to be inserted into a pneumatic or hydraulic device to prevent the pneumatics or the hydraulics from slipping once the power has been shut off.

7 Claims, 5 Drawing Sheets

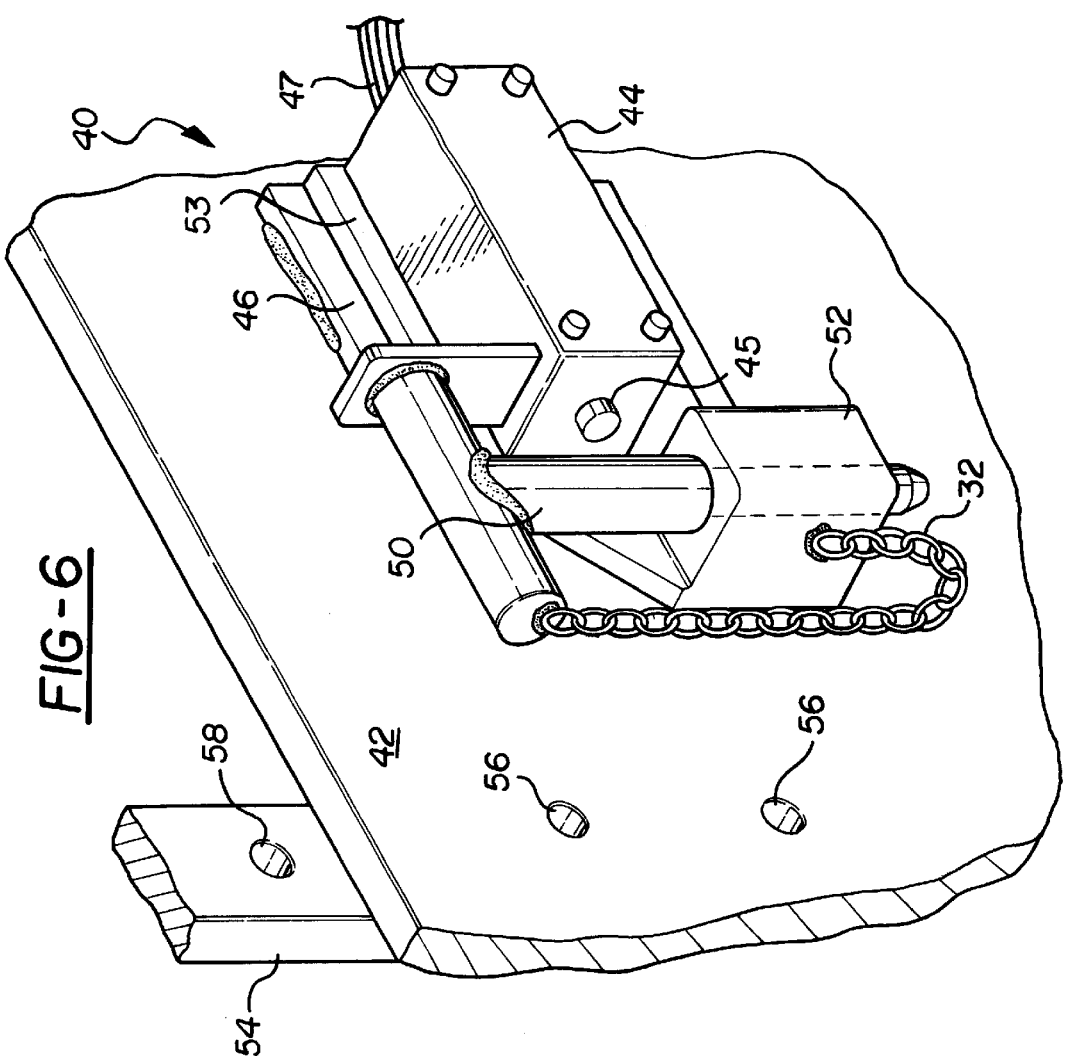
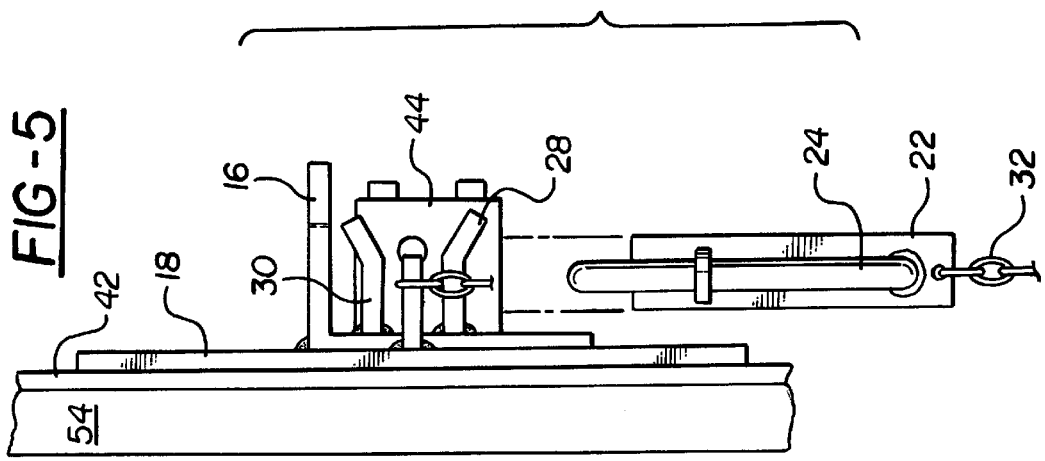

ELECTRICAL AND PNEUMATIC LOCK-OUT DEVICE

This application claims the benefit of U.S. Provisional Application No.: 60/131,480 filing date Apr. 29, 1999.

TECHNICAL FIELD

The invention relates to electrical shut-off devices, and more particularly relates to an electrical and pneumatic lock-out device for gates and machinery frames generally in the automotive assembly art.

BACKGROUND OF THE INVENTION

Maintenance crews and automotive assembly plants and other manufacturing operations have a long felt need for more safety equipment in order to electrically and/or pneumatically shut off equipment that they are working on. The men and women performing the maintenance need to make sure that neither the electricity nor the pneumatics are operational on the machine which they are maintaining. Prior art methods of shutting off electricity have included walking over to the electrical control panel and turning off all the electricity to a particular part of the room in which the maintenance is being performed, or if wired properly, shutting off the electrical circuits to the machine being worked on. Many times these control panels are not in sight of the maintenance workers. Needless to say, third parties who do not know about the maintenance operation can turn the electricity back on without the knowledge of the maintenance crew, yielding an unsafe situation. As can be imagined, maintenance crew workers would have more confidence in their safety if they knew that they had the control and only they could turn off the electrical circuits that were shut off to the area in which they are working, and that there was not an ability for a third person to turn the electricity back on. The maintenance crew needs to know that both the electrical system and the pneumatic system have been shut off in the case of lifter machines and other equipment which utilize both electrical and pneumatic devices.

Moreover, maintenance crews are subject to placing themselves in danger to save a little time by turning off the electricity within a certain area, and then returning to attempt to only turn on the electricity to a certain portion, while still being within the area of danger. It is necessary for the electricity to be shut off to the entire area in order for a maintenance person to perform his or her task in a totally safe manner. The temptation may always be there for trying to partially operate a machine while hoping that they do not get caught in the mechanics of another portion which should be shut off. In normal assembly plants, there are work cell safety gates which separate various machines in order to create safety zones, and it would be most prudent if the electrical and pneumatic shut off could occur even at the gate entering the safety zone which incorporates the manufacturing equipment. For instance, a gate entering into a lifting machine could have all the electricity shut off the minute that the gate is opened up. Furthermore, safety lock-out devices could be utilized on the lifter to render the pneumatics immobile, thereby giving the maintenance person a green light to perform their expected duties.

OSHA regulations have attempted to provide safety mechanisms for the maintenance crews in order to reduce injuries and down time. Many times, maintenance crews and machine operators have figured out how to electrically "jumper", tamper, override or bypass the safety equipment. This has resulted in numerous injuries and expense to companies for repairs. It would be most desirable to have a failsafe system for rendering the machine within a gated area to be non-operational during the maintenance period.

Therefore, it would be an advantage to the art to provide an electrical and pneumatic lock-out device for rendering machines completely free of the possibility of them being turned on or moved while the maintenance person is performing his or her tasks.

It would be yet a further advantage to provide a complete electrical and pneumatic lock-out device which cannot be manually overridden or bypassed.

SUMMARY OF THE INVENTION

In seeking to provide the advantages noted above, there is an electrical and pneumatic lock-out device constructed in accordance with the present invention that will achieve all of the advantages desired. The electrical and pneumatic lock-out device of the present invention is as simple as possible, while still utilizing safety interlock switches known in the prior art and regularly accepted in the industry.

In one embodiment of the present invention, an electrical gate lock-out device is disclosed which includes a safety interlock switch mounted to the work cell gate frame by a mounting bracket which further includes a locking mechanism to be activated by either a key or an actuator button for the engagement and disengagement of a switch key and a lock-out safety pin which holds the door shut and turns on the electricity. Once the key and lock-out safety pin combination has been removed, then a mechanical shut-out device is opened up. The interesting aspect of the invention is that the lock-out safety pin is permanently attached, i.e. welded, to the electrical shutoff key which is pulled out of the safety interlock switch. In essence, if the welded lock-out safety pin/key combination is removed from its engaged position, the electricity is shut off once the gate has an opportunity to be opened. As long as the gate is locked shut, the electricity may be turned on. However, for the gate to be opened, even a few centimeters, the electricity must be shut off as the opening device for the gate is welded to the key that turns off the electricity.

In yet a second embodiment, the same lock-out safety pin is welded to a key that is mated to the same type of safety interlock switch, but in this embodiment, the lock-out safety pin is also welded to a safety pin to be inserted into a stroke bar in order to pneumatically render a lifting machine inoperable.

BRIEF DESCRIPTION OF THE DRAWINGS

FIG. 5 is the side elevational view of the electrical gate lock-out device in a disengaged position;

FIG. 6 is a perspective view of the second embodiment of the present invention, which is the electrical and pneumatic machine lock-out device;

DETAILED DESCRIPTION OF THE INVENTION

Figure 1:
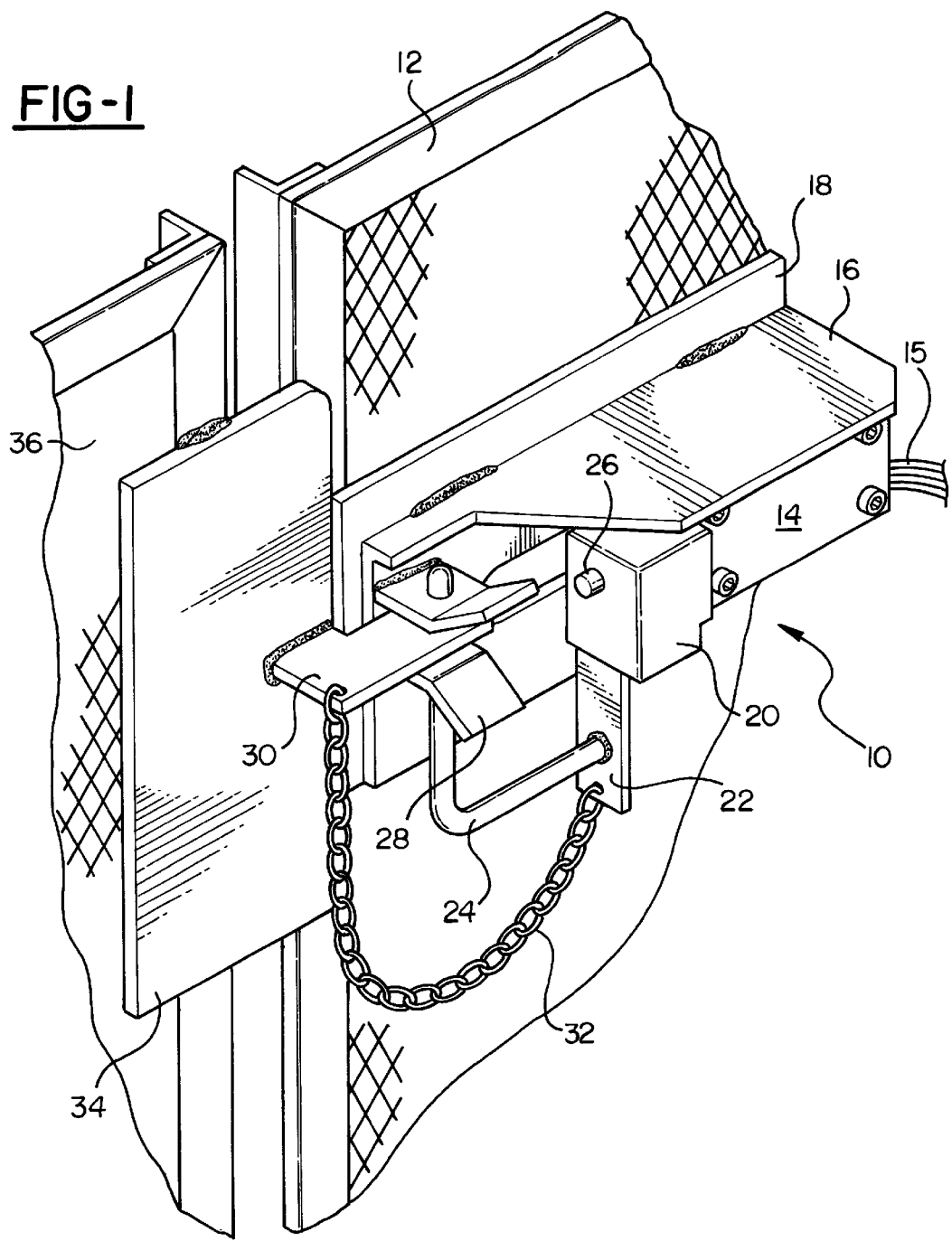
FIG. 1 is a perspective view of the first embodiment of the invention, i.e. the electrical gate lock-out device in the engaged position.

Looking first to FIG. 1, a gate having an electrical gate lock-out device generally denoted by the numeral 10 is illustrated which includes a gate frame 12 to which a tapping plate 18 is permanently mounted. Tapping plate 18 has a mounting bracket 16 attached thereto acting to protect a safety interlock switch 14 for shutting off electricity to any machinery which may be contained within the gate. Safety interlock switch 14 has the electrical wires 15 extending therefrom. The lock 20 has an actuator button 26 that, when pressed, releases key 22, and thereby releases lock-out safety pin 24. Once the lock-out safety pin 24 has been removed, the gate mounting plate extension 30 can be slid out of cleavis 28 in order to open gate 12. A mounting plate 34 is permanently attached to gate door section 36, thereby allowing maintenance crews to enter through the gate and do their respective job of maintaining the equipment that is contained within the gate. With combined references to the following figures, the operation can be seen in greater detail.

Figure 2:
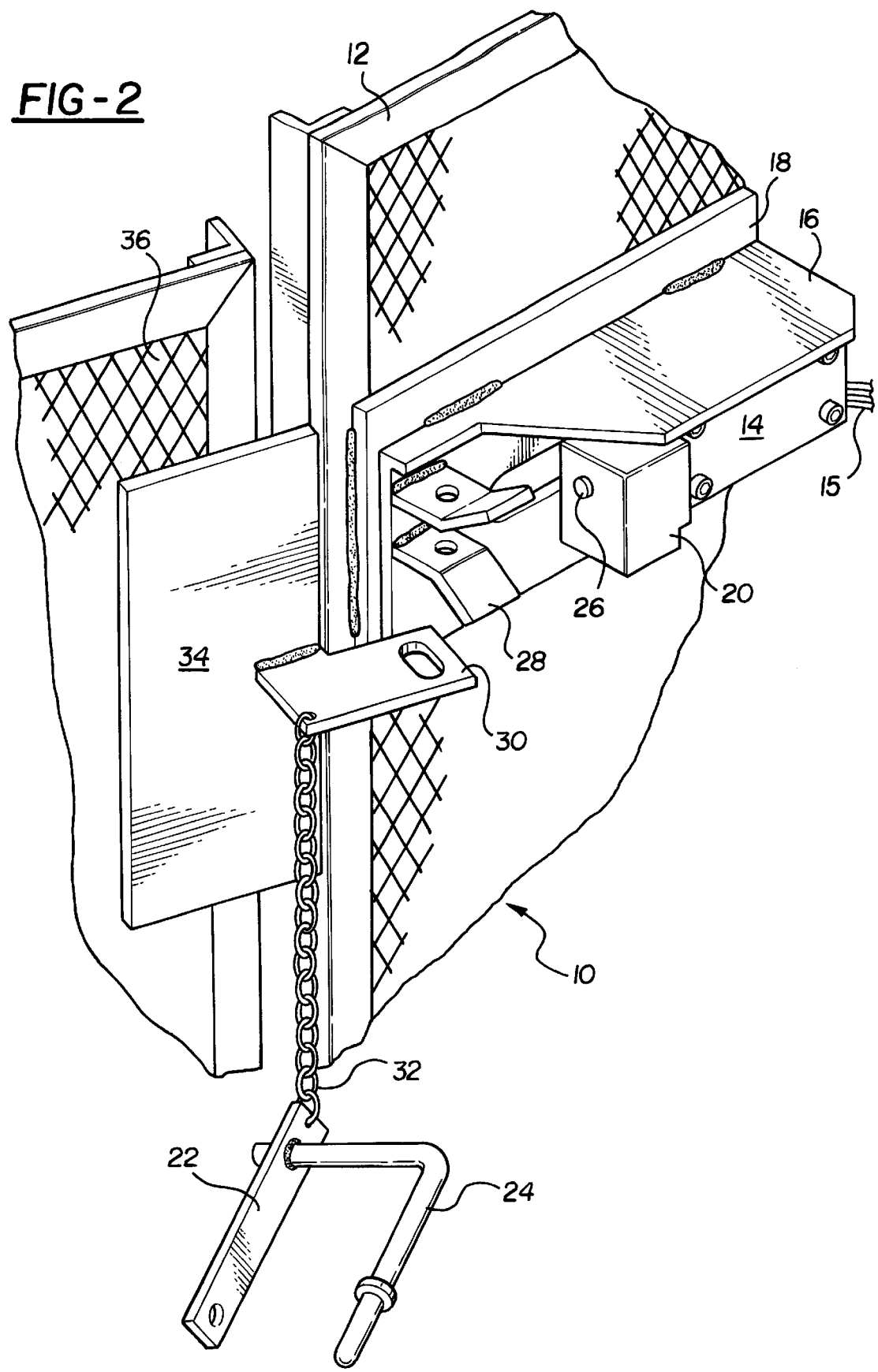
FIG. 2 is a similar perspective view of the gate having the electrical gate lock-out device in a disengaged position.

Looking now to FIG. 2, the key 22 and lock-out safety pin 24 have been disengaged from lock 20, such that gate door 36 can swing open from its relative position with gate frame 12. As one can imagine, once key 22 is dropped out of lock 20, this is a means for disengaging the safety interlock switch 14, such that the electrical wiring 15, which runs there through to energize the equipment located within the gate, is now shut off. Therefore, the safety feature of the key and safety pin combination means that whenever the gate is opened up, the electricity is automatically shut off. If key 22 becomes separated from safety pin 24, it is possible that the key could be shoved back into the lock 20 while the gate is opened, thereby defeating one of the major purposes of the present invention.

Figure 3:
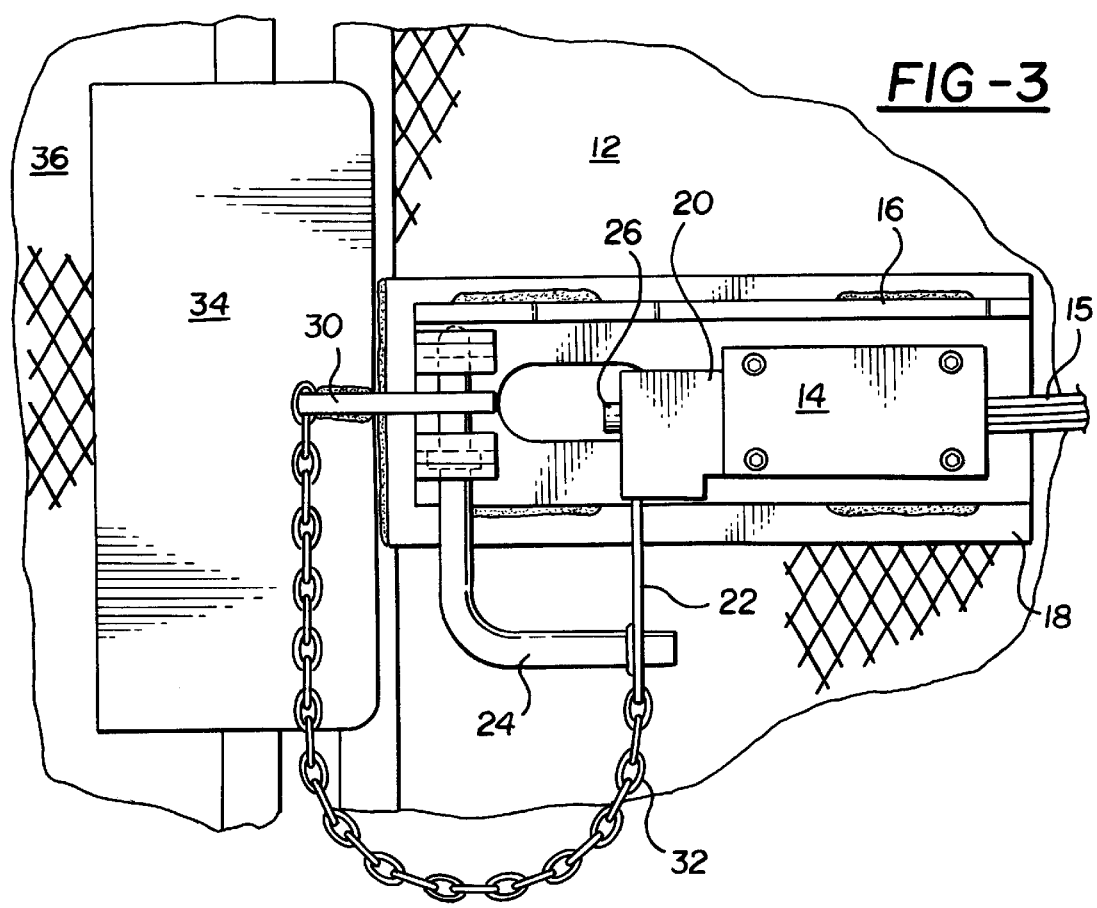
FIG. 3 is the front elevational view of the electrical gate lock-out device in its engaged position.

Referring next to FIG. 3, another view of the present invention is shown which indicates the relative placement of key 22, safety lock-out pin 24 and the optional chain 32 which attaches the key 22/safety pin 24 combination to the gate mounting plate 34 on the gate door 36. The preferred safety interlock switch is a Telemechanique switch available from Telemechanique, Inc., of France. Another acceptable switch is available from Square D Company of Madison Heights, Michigan. Other suitable switches are also contemplated by this invention.

Figure 4:
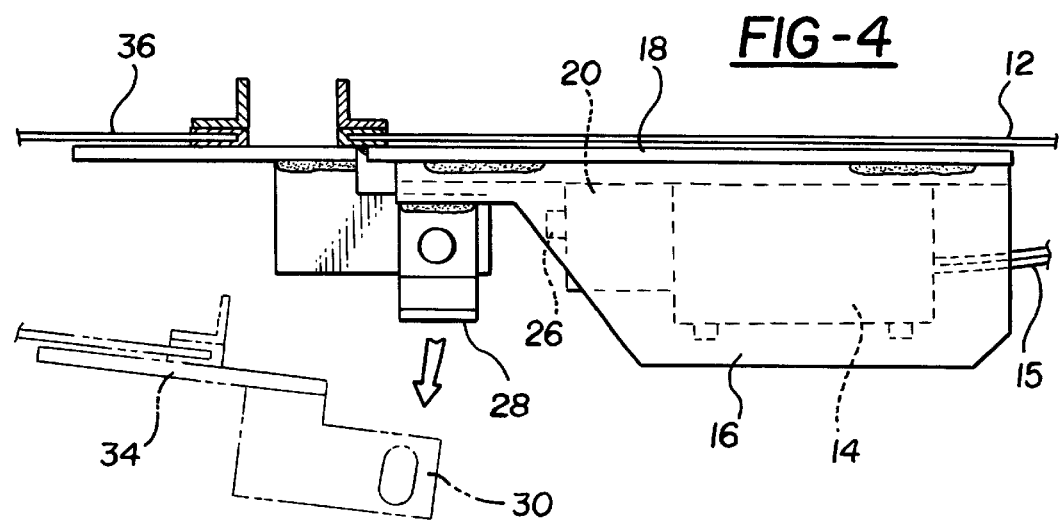
FIG. 4 is a top plan view of the electrical lock-out device in a disengaged position.

Looking next to FIG. 4, one can see that this is a top plan view of the gate in its open state after the key and safety pins have been disengaged. The gate door 36 is now free to open and the key and safety pin combination will swing down from mounting plate 34, so that the key cannot be inserted back into lock 20, thereby enabling the safety interlock switch 14 in order to turn on the equipment within the gate enclosure.

Looking, finally, to FIG. 5, there can be seen the side elevational view showing the relative placement of safety pin 24 and key 22 with relation to cleavis 28 and the gate mounting plate extension 30, which acts as a receiver for chain 32.

The above-described embodiment of the present invention basically acts to electrically shut off all equipment that is enclosed within a gate. Essentially, the same lock-out device can be utilized for individual pieces of equipment, in addition to the gate lock-out device. It is anticipated that to maximize the safety potential of the present invention, it would be best to use a combination of both devices, i.e. the electrical lock-out device as shown in FIGS. 1–5, as well as the electrical and pneumatic lock-out device illustrated in FIGS. 6–8. The reason that I feel this way is that it is possible, if the machine is deep within a gated enclosure, that a third party could come along and close the gate, reinsert the key and safety pin in order to operate yet another piece of machinery within the gate enclosure, and cause a dangerous situation for any maintenance crews that have gotten into the gated area.

Therefore, it would be best to also use an electrical and pneumatic lock-out device, if necessary, or merely an electrical lock-out device, if warranted, on each piece of equipment that was being maintained in addition to the lock-out device attached to the gate leading to the equipment being maintained.

Having said that, we now look to FIG. 6, which shows an electrical and pneumatic lock-out device which is appropriate for use in equipment that uses both electricity and pneumatics for its operation, such as lifters, large slideways, and other pneumatically operated equipment that also uses electrical components. There is shown the electrical and pneumatic lock-out device constructed in accordance with the present invention as generally denoted by the numeral 40. As this embodiment is being explained with a specific description of a lifter having an exterior frame, there is shown a lifter/shuttle frame 44 to which a safety interlock switch 44 has been attached via a tapping plate 46. The safety interlock switch 44 may be of any type of generally accepted safety interlock switch, although the particular embodiment illustrated is that of a Telemechanique brand safety switch manufactured and distributed in France. In this embodiment, the key is inserted into the switch from the top side, rather than from underneath as shown in FIGS. 1–5. Key 48 is permanently attached to a t-bar safety pin 50 which is held in place within a safety pin holder 52. It is also attached by a chain 32 to the t-bar portion of the key/safety pin combination 48. The lifter or shuttle plate 42 is placed directly next to stroke bar 54 for safety pin having stroke bar holes 58 drilled there through. Mating and complimentary safety pin holes 56 are drilled into lifter shuttle frame 42 in order to be matched with the stroke bar holes 58.

Figure 7:
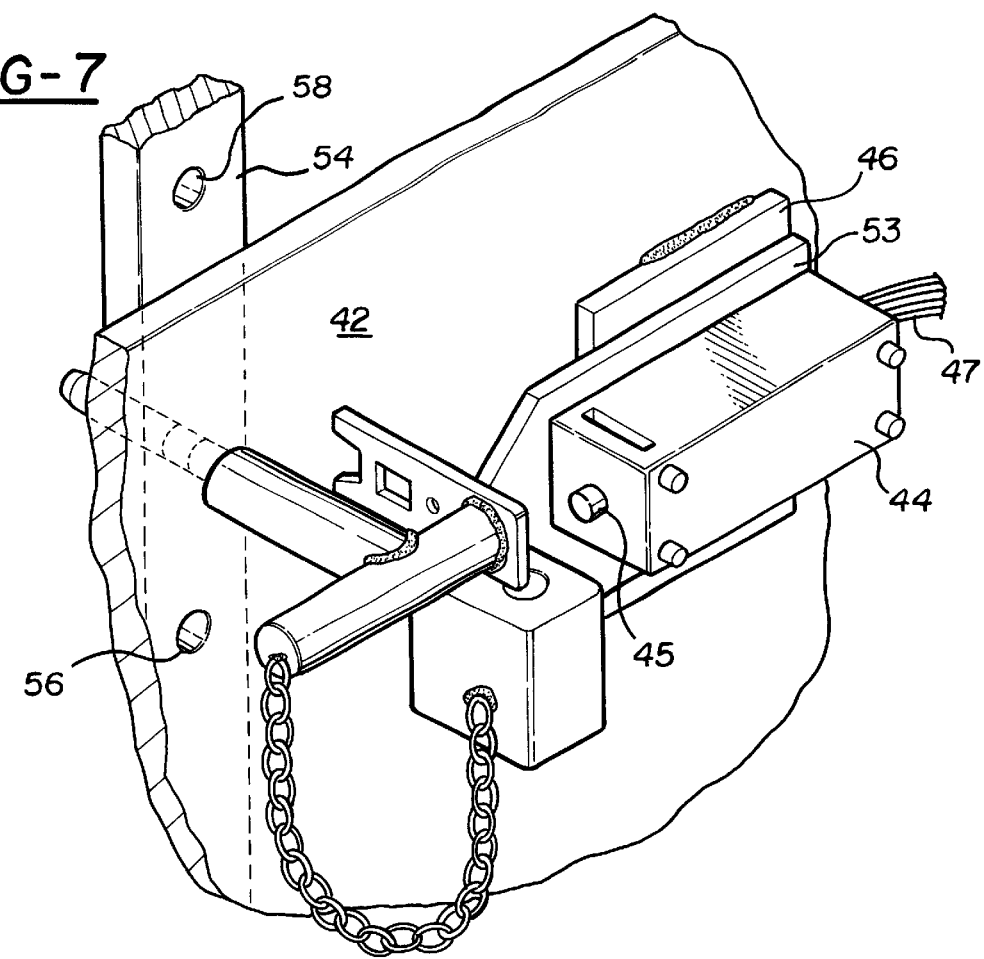
FIG. 7 is a perspective view of the electrical and pneumatic machine lock-out device in an engaged position.

Looking next to FIG. 7, there can be seen the key 48 in permanent attachment to the safety pin 50 in a disengaged situation from the safety interlock switch 44. The pin portion of the safety pin has been inserted into a safety pin hole 56 and mated with a stroke bar hole 58 in the body of the stroke bar 54. Therefore, the safety/shuttle frame 42 can neither move up nor down due to erratic pneumatic activity unknown to the maintenance worker. In essence, the pneumatic system will not crank by itself, although it may lose pressure and drop certain parts which could crush the hands or body of the maintenance crew worker. Therefore, the safety pin 50 being inserted into the two safety pin and stroke bar holes 56 and 58, respectively, act as a safety measure against the pneumatics letting go and dropping portions of the equipment onto the maintenance man.

Figure 8:
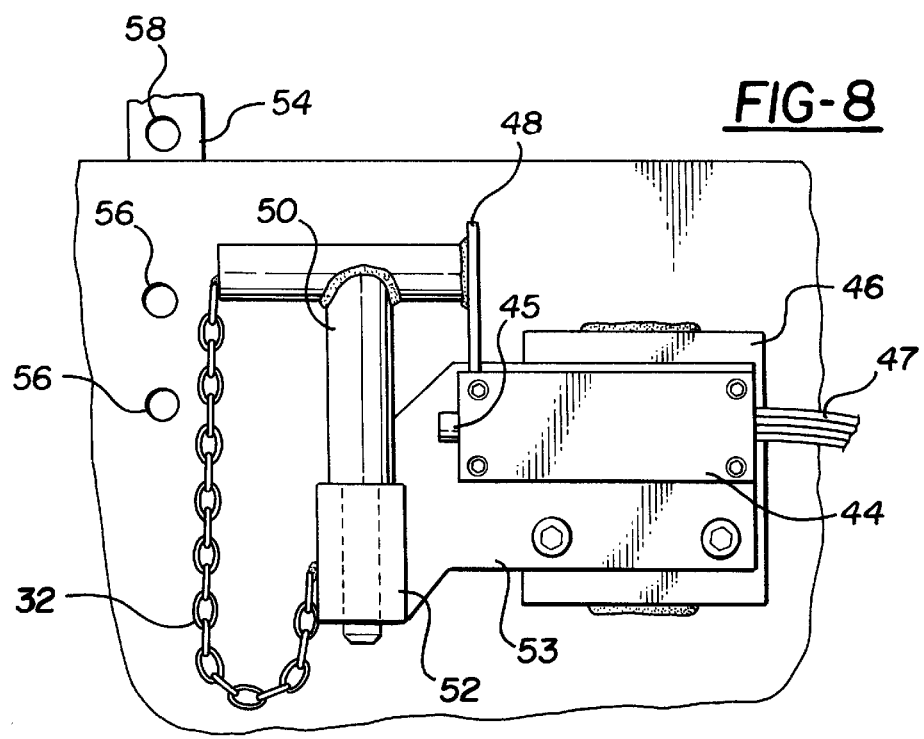
FIG. 8 is a front elevational view of the electrical and pneumatic machine lock-out device in an engaged position.

Reviewing next the front elevational view of the entire lock-out device of FIG. 8, the safety pin 50, which is permanently attached to key 48 by a t-bar, is held in place with the safety pin holder 52 while the key is inserted into safety interlock switch 44 via actuator button 45. The safety interlock switch 44 is attached to a tapping plate 46 which is permanently attached to the lifter/shuttle frame 42. It is found that, in practice, it is easier to permanently weld a tapping plate 46 to the lifter/shuttle frame 42 and tap some complementary and mating tap holes into it in order to receive bracket 53 which holds the safety pin holder 52. Bracket 53 can easily and removeably be attached to the tapping plate without drilling numerous holes into the lifter/shuttle frame, and also acts as a guide in the event that the safety interlock switch 44 must be replaced, thereby giving an exact placement of where it should be via tapping plate 46. Again, the electrical wires 47 will be made to have an incomplete circuit when key 48 is removed out of safety interlock switch 44.

In today's common assembly lines, manufacturing machinery such as disclosed in the embodiment in FIGS. 6–8, i.e. a work piece lifter machine, need to be totally shut down, both electrically and pneumatically, before a prudent maintenance worker can go into the machine for repair. In the operation of such machinery, it would be very easy to lose a hand, an arm, or other body parts if the lifter was released and slammed to the ground. Therefore, it is imperative that the safety pin is properly located in order to hold the lifter into a position for repair. It may also be important that once a single machine is shut down, the entire assembly line should be shut down. The electrical wires that come into the safety interlock switch may be a shut off mechanism for the entire assembly line, or it may cut off just a portion of the machinery in that assembly line in order to ensure the safety of the workmen.

While the preferred switch is that already described above, i.e. the Telemechanique switch, available from Telemechanique, Inc., in France, other safety interlock switches which are generally accepted in the automotive and manufacturing industries could be utilized. This would help to make the safety interlock switch portion of the present invention an off-the-shelf item. So long as the key can have a portion which can extend significantly enough outside of the safety interlock switch for it to be permanently attached to the safety pin somehow, the safety interlock switch corresponding to that key may be acceptable.

Of course, the present invention has been described in the context of two very specific embodiments, although many other embodiments can be envisioned by the present inventor, such as other types of safety interlock switches, other pieces of equipment which need to be shut off electrically, pneumatically and/or hydraulically. The safety pin could be used to stop hydraulic equipment in addition to pneumatic, or any other form of power that is known to one of ordinary skill in the art. So long as the safety pin can be attached to the key so that when the safety pin is removed, the key is also removed, therefore simultaneously shutting off the electricity and operating or disengaging the mechanism at the same time.

The scope of the present invention, although disclosed with regard to the above-mentioned specific embodiments, shall only be limited by the scope of the appended claims.

What is claimed is:

1. A lock-out device to shut off power supplies to a mechanism for enhancing the safety of a worker during maintenance and other operations, comprising:

a) a safety interlock switch for electrical lock-out of the mechanism, said switch having electrical wires attached therein for electrical communication between said interlock switch and the mechanism, said safety interlock switch completing the electrical communication between the interlock switch and the mechanism; when a key is received within the safety interlock switch completing the electrical communication; and b) a lock-out safety pin for enabling the mechanism to be opened up for maintenance and other operations, said safety pin being permanently attached to the key, such that when the key is not received within the switch, the power is shut off and the lock-out safety pin can be removed from a position within the mechanism, whereby the mechanism is disabled from operation for maintenance, and the power is also disconnected for the safety of the worker.

2. The lock-out device of claim 1, further comprising an actuator button to release the key and cut the power.

3. The lock-out device of claim 1, wherein the key is permanently welded to the lock-out safety pin.

4. The lock-out device of claim 1, wherein the mechanism includes a utility gate enclosing manufacturing machinery.

5. The lock-out device of claim 4, further comprising a gate mounting plate extension for receiving the lock-out safety pin and keeping the gate locked shut.

6. The lock-out device of claim 4, further comprising a cleavis welded to the gate to receive the gate mounting plate extension.

7. The lock-out device of claim 6, wherein said key and safety pin are welded together in a configuration such that the key and the safety pin will be simultaneously disengaged to shut off power and open the mechanism when pulled out and simultaneously engaged when the key and the safety pin are inserted into the safety interlock switch and the cleavis simultaneously.

\* \* \* \* \*